Figure 1:
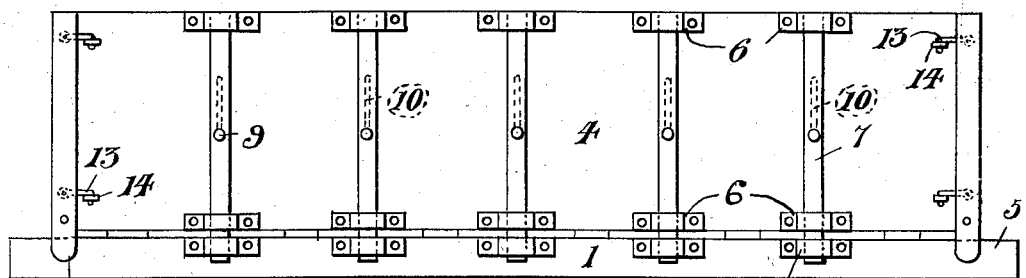

C. HEINZ & J. DU ROTH.
COLLAPSIBLE CAR BODY.
APPLICATION FILED APR. 12, 1913.

1,093,574.

Patented Apr. 14, 1914.

WITNESSES
J. P. Appleman,
Ralph C. Evert.

INVENTORS
Carl Heinz,
John Du Roth
BY Henry C. Evert
ATTORNEY

UNITED STATES PATENT OFFICE.

CARL HEINZ AND JOHN DU ROTH, OF JOHNSTOWN, PENNSYLVANIA.

COLLAPSIBLE CAR-BODY.

1,093,574.     Specification of Letters Patent.     Patented Apr. 14, 1914.

Application filed April 12, 1913. Serial No. 760,792.

*To all whom it may concern:*

Be it known that we, CARL HEINZ and JOHN DU ROTH, citizens of the United States of America, residing at Johnstown, in the county of Cambria and State of Pennsylvania, have invented certain new and useful Improvements in Collapsible Car-Bodies, of which the following is a specification, reference being had therein to the accompanying drawing.

This invention relates to a collapsible car body, and our invention aims to provide, first, means whereby a gondola or semi-box car body can be converted into a flat bottom body to permit of various kinds of merchandise being carried upon the body of the car and easily removed therefrom. Second, a truck frame having foldable walls that can be easily and quickly collapsed when not in use. Third, a truck frame having foldable walls provided with means for maintaining the same rigid when in a set up position. Fourth, a gondola, which when not in use or is being returned empty, facilitates the movement of trainmen from one end of the train to the opposite end, when the train is in motion.

The invention further aims to accomplish the above results by a combination of elements that will be hereinafter specifically described and then claimed.

Reference will now be had to the drawing, wherein there is illustrated a preferred embodiment of the invention, but it is to be understood that the structural elements thereof are susceptible to such changes as fall within the scope of the appended claims.

Reference will now be had to the drawing, wherein like numerals denote corresponding parts throughout the several views, in which:—

Figure 2:
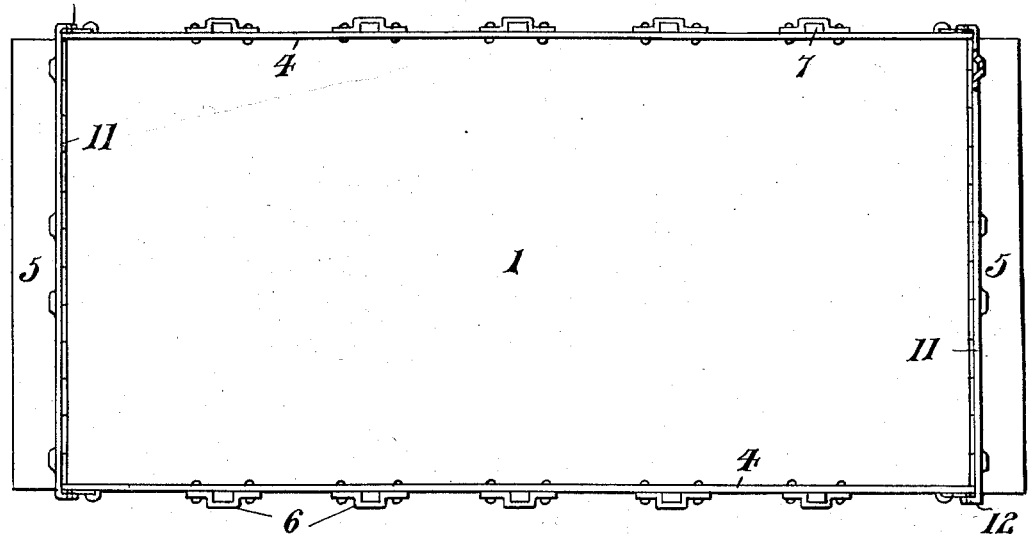
Figure 3:
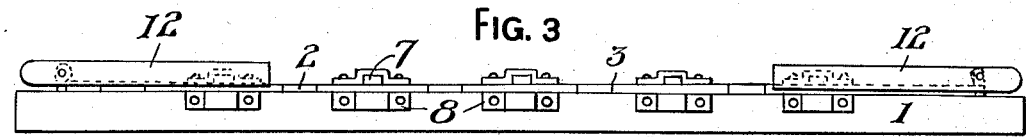
Figure 4:
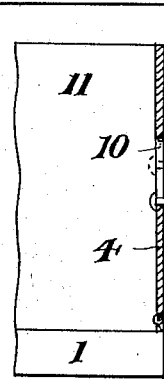

Figure 1 is a side elevation of a car body in accordance with our invention, Fig. 2 is a plan of the same, Fig. 3 is a side elevation of the car body in a collapsed position, and Fig. 4 is a vertical sectional view of a portion of the car body in a set up position.

The reference numeral 1 denotes the bottom of a car or truck frame having longitudinal edges thereof hinged as at 2 and 3, to the longitudinal edges of the foldable side walls 4, which latter are of less length than the truck frame 1. The ends of the truck frame 1 are indicated at 5 and constitute sills. The outer sides of the walls 4 are provided at the upper and lower edges thereof, with vertically alining straps 6 and slidably mounted in said straps are locking bars 7 adapted to extend in the straps 8 carried by the sides of the frame 1, the straps 8 vertically alining with the straps 6 when the side walls are in a vertical position. The locking bars 7 are limited in their movement relatively to the side wall 4 by rivets or pins 9 extending in the vertical slots 10 provided therefor in the wall 4, as shown in Fig. 4.

Hinged to the truck frame 1, similar to the walls 4, are transverse end walls 11 having the vertical edges thereof flanged, as at 12 to engage the outer sides of the side walls 4. The flanges 12, adjacent to the upper and lower ends thereof, are provided with pivoted hooks 13 adapted to engage in eyes or staples 14, carried by the outer sides of the side walls 4. These hooks and staples maintain the end walls 11 in a vertical position relatively to the side walls 4, and after the side walls have been folded upon the truck frame, the end walls can be swung inwardly to a closed position, as best shown in Fig. 3 of the drawing.

The walls of the car body have been conventionally illustrated and can be reinforced or stiffened by angle bars suitably disposed.

What we claim is:—

1. The combination with a truck frame, side walls adapted to fold inwardly upon said frame, end walls adapted to fold inwardly upon the outer sides of said side walls, locking bars vertically disposed in parallelism upon the outer sides of said side walls, straps carried by said truck frame and adapted to receive the lower ends of said bars for maintaining said walls in a vertical position, and means carried by said end walls for engaging the ends of said side walls whereby said end walls will be maintained in a vertical position.

2. The combination with a truck frame, side walls hinged thereto and adapted to fold inwardly upon said frame, end walls hinged to said truck frame and adapted to fold inwardly upon the outer sides of said side walls, straps carried by the outer sides of said side walls, vertically disposed parallel locking bars arranged in said straps, straps carried by said frame and adapted to receive the lower ends of said locking bars, means carried by said bars and engaging in said side walls for limiting the opening and closing movement of said bars, and means carried by said end walls and adapted to engage the ends of said side walls whereby said end walls will be maintained in a vertical position relatively to said side walls.

In testimony whereof we affix our signatures in the presence of two witnesses.

CARL HEINZ.
JOHN DU ROTH.

Witnesses:
FLORENCE M. GOVIER,
ELLA L. MASER.